United States Patent [19]
Oshida et al.

[11] Patent Number: 6,036,199
[45] Date of Patent: Mar. 14, 2000

[54] TIRE CONTACT LOAD CONTROL SYSTEM

[75] Inventors: Kei Oshida; Masaki Izawa, both of Wako, Japan

[73] Assignee: Honda Giken Kogyo Kabushiki Kaisha, Tokyo, Japan

[21] Appl. No.: 09/083,718

[22] Filed: May 22, 1998

Related U.S. Application Data

[63] Continuation-in-part of application No. 09/040,081, Mar. 17, 1998, and a continuation-in-part of application No. 09/047,008, Mar. 24, 1998.

[30] Foreign Application Priority Data

Jun. 24, 1997 [JP] Japan ................................ 9-166738

[51] Int. Cl.$^7$ .................................................. B62B 5/02

[52] U.S. Cl. ........................................ 280/5.504; 280/5.52

[58] Field of Search ............................. 280/5.504, 5.52

[56] References Cited

U.S. PATENT DOCUMENTS

| | | | |
|---|---|---|---|
| 4,625,993 | 12/1986 | Williams et al. | 280/707 |
| 5,015,009 | 5/1991 | Ohyama et al. | 280/5.52 |
| 5,044,660 | 9/1991 | Yamamura et al. | 280/5.52 |
| 5,183,127 | 2/1993 | Kageyama et al. | 280/5.52 |
| 5,269,556 | 12/1993 | Heyring | 280/5.52 |

*Primary Examiner*—Kenneth R. Rice
*Attorney, Agent, or Firm*—Carrier, Blackman & Associates, P.C.; Joseph P. Carrier; William D. Blackman

[57] ABSTRACT

An active actuator is interposed between the unsprung mass and the sprung mass of a vehicle, and a controller selectively extends and retracts the actuator at a prescribed acceleration so as to selectively apply an additional contact load to the wheel by making use of the inertial force of the sprung mass and/or the unsprung mass of the vehicle. A particularly advantageous result can be achieved by increasing the tire contact load according to the judgment of the vehicle operator who would, for example, actuate a switch at a desired or appropriate time such as when braking the vehicle, turning a curve or accelerating on a slippery road surface.

5 Claims, 5 Drawing Sheets

TIRE CONTACT LOAD CONTROL SYSTEM

CROSS REFERENCE TO RELATED APPLICATION

This is a continuation-in-part application of copending patent applications No. 09/040,081 filed Mar. 17, 1998 currently pending and No. 09/047,008 filed Mar. 24, 1998 currently pending. Also, the contents of another copending application No. 09/083,717 of even date currently pending are hereby incorporated in this application by reference.

TECHNICAL FIELD

The present invention relates to a tire contact load control system for increasing the road wheel contact pressure on the road surface as needed by actuating an actuator interposed between the sprung mass and the unsprung mass of the vehicle at a certain acceleration.

BACKGROUND OF THE INVENTION

The gripping force F of a tire can be given by the product of the frictional coefficient $\mu$ between the tire and the road surface and the vertical contact load W acting on the tire contact surface ($F=\mu W$). In other words, the tire gripping force which plays an important role in the handling of the vehicle is proportional to the magnitude of the tire contact load for a given road condition.

It is well known that the handling of a vehicle is severely impaired when a road wheel thereof is locked up when braking. In particular, on a road surface such as a frozen road surface and a gravel road surface which could significantly reduce the gripping force of the tire, it is important to apply as large a braking force to the wheel as possible, but, without locking the wheel.

The road gripping force of a tire is important also when accelerating a vehicle. When a vehicle is excessively accelerated for a given road condition, the tires start slipping, and not only a desired acceleration is prevented from being achieved, but also the lateral stability of the vehicle may be lost. By noting this problem, it has been proposed to control the traction force of each driven wheel so that the slip ratio of the wheel may be kept within a limit, and a maximum available traction may be obtained at all times. The traction control system is designed to carry out such a control action. However, the conventional traction control system was not able to increase the magnitude of the available traction, and simply reduces the torque transmitted to the wheels so as to prevent the slip ratio from exceeding a prescribed limit.

The tire gripping force is also important in ensuring an adequate lateral force for each tire when the vehicle is making a turn. If the maximum available tire gripping force is insufficient for the cornering movement of the tire as often the case when the road surface is frozen or otherwise slippery, the tire may excessively slip sideways, causing the vehicle to spin or drift out in extreme cases.

When a linear actuator interposed between a wheel and a vehicle body is either extended or retracted at a certain acceleration, a corresponding inertia force is produced in the sprung mass and the unsprung mass. The reaction of such an inertia force may be used to increase the contact load of the road wheel or the gripping force of the tire. Therefore, when this concept is implemented, it is possible to increase the tire gripping force which may serve as the braking force, the traction force and/or the lateral force of the wheel. In particular, the inventors have recognized an optimum result can be achieved if the contact load of the wheel is increased when the slip ratio of the wheel is about to exceed a threshold level beyond which the tire grip force starts diminishing.

BRIEF SUMMARY OF THE INVENTION

In view of such problems of the prior art and the recognition by the inventors, a primary object of the present invention is to provide a vehicle tire contact load control system which can selectively increase the tire contact load of a road wheel.

A second object of the present invention is to provide a vehicle tire contact load control system which can increase the gripping force of a road wheel for a given road condition.

A third object of the present invention is to provide a vehicle tire contact load control system which can maximize the braking, the traction force and/or the lateral force of a vehicle on a given road surface.

A fourth object of the present invention is to provide a vehicle tire contact load control system which can improve the handling of a vehicle on a low-$\mu$ road surface.

According to the present invention, such objects can be accomplished by providing a vehicle tire contact load control system, comprising: a wheel suspension system for supporting an unsprung mass including a wheel to a sprung mass including a vehicle body; an active actuator interposed between the unsprung mass and the sprung mass; a controller for extending the actuator at a prescribed acceleration so as to selectively apply an additional contact load to the wheel; and a switch unit for activating the controller. The extended actuator may be retracted at such a time when the tire contact load is not so critical.

Thus, the tire contact load can be increased according to the judgment of the vehicle operator such as when braking the vehicle, turning a curve or accelerating on a slippery road surface. In view of giving the vehicle operator a sufficient time to be ready for the change in the contact load of the tire and the resulting change in the handling of the vehicle, a timer may be provided in connection with the switch unit or the controller for delaying activation of the controller from a time when the switch unit is operated. Typically, the system further comprises a stroke sensor for detecting a stroke of the actuator, and stopping operation of the controller when a stroke end of the actuator is detected by the stroke sensor.

To prolong the duration of the contact load control, the controller may be adapted to cyclically operate the actuator so as to increase a contact load in a cyclic manner for a relatively long period of time. This is particularly advantageous when the vehicle is caught in a slippery spot of the terrain, and an attempt is being made to move the vehicle out of this spot. In this case, it is convenient if a timer is provided so that the operation of the actuator may be stopped after elapsing of a prescribed time period from a start of operation of the actuator.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
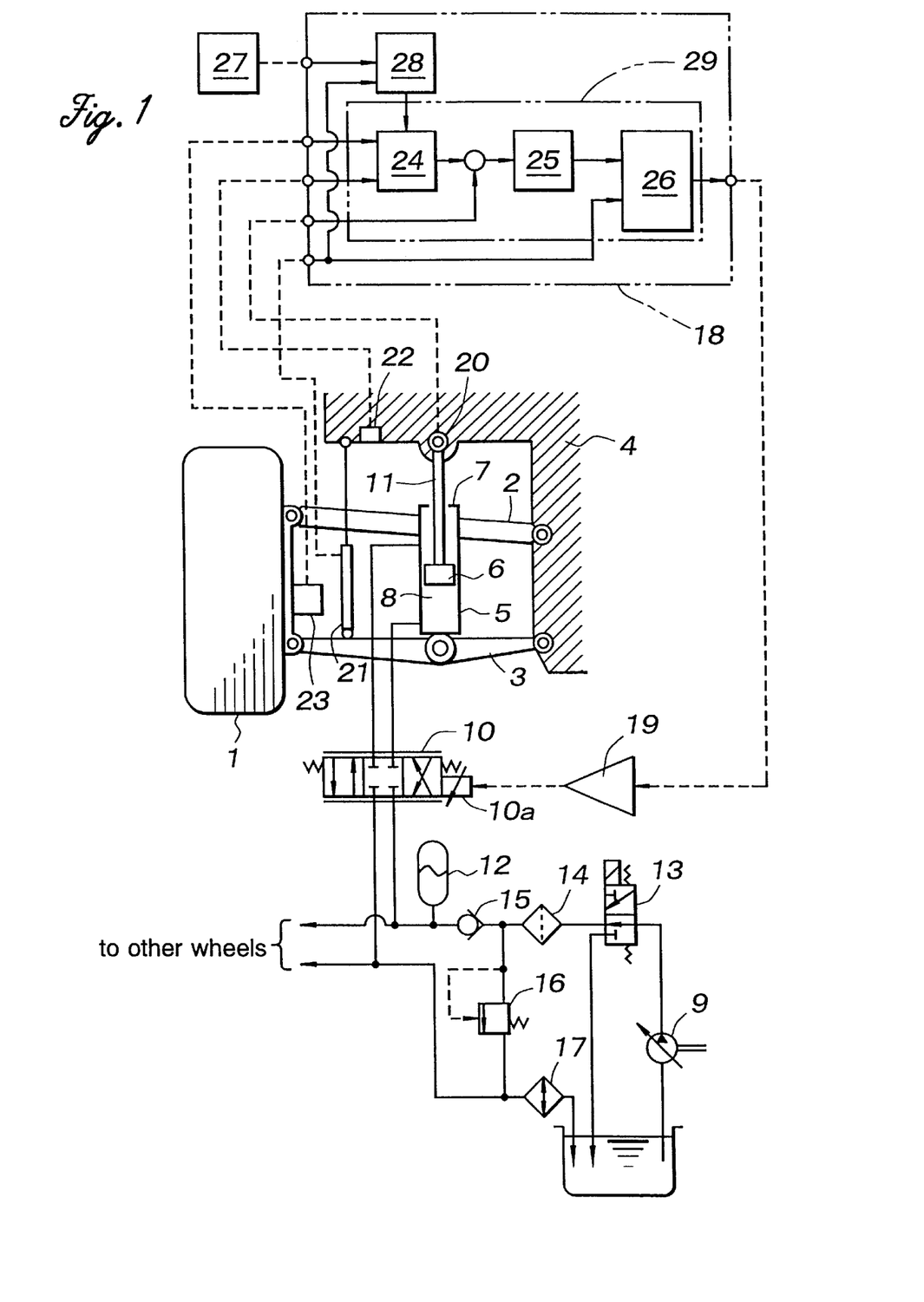
FIG. 1 is a schematic diagram showing a preferred embodiment of the vehicle tire contact load control system according to the present invention.

FIG. 1 schematically illustrates an essential part of an active wheel suspension system to which the present invention has been applied. A tire wheel 1 is supported by upper and lower suspension arms 2 and 3 so as to be moveable vertically with respect to a vehicle body 4. A linear actuator 5 consisting of a hydraulic cylinder is connected between the lower suspension arm 3 and the vehicle body 4. The linear actuator 5 includes a piston 6 received in a cylinder defining an upper oil chamber 7 and a lower oil chamber 8, and a thrust force is produced in a piston rod 11 by controlling the hydraulic pressures transmitted from a variable capacity oil pump 9 to these oil chambers 7 and 8 via a servo valve 10. Thereby, the relative distance between the center (axle) of the wheel 1 and the vehicle body 4 can be controlled at will.

The oil delivered from the pump 9 is initially stored in an accumulator 12 to remove the pulsating ripples in the oil pressure, and avoid shortage of the oil flow during a transient process. The pressure is then transmitted to each of the wheels 1 via the corresponding servo valve 10. This oil circuit further comprises an unloading valve 13, an oil filter 14, a check valve 15, an oil pressure regulating valve 16, and an oil cooler 17, but these components are conventional and are therefore not described here in any great detail.

The servo valve 10 controls the magnitude and direction of the hydraulic pressure applied to the hydraulic actuator 5 in a continuous manner according to a control signal supplied from an electronic control unit (ECU) 18 to a solenoid 10a of the servo valve 10 via a servo valve driver 19. The ECU 18 produces the control signal by processing output signals from a load sensor 20 interposed between the vehicle body 4 and the piston rod 11, a stroke sensor 21 interposed between the vehicle body 4 and the lower suspension arm 3, a sprung mass acceleration sensor 22 for detecting the vertical acceleration of the vehicle body 4, and an unsprung mass acceleration sensor 23 for detecting the vertical acceleration of each wheel 1 according to a control algorithm illustrated in FIG. 2.

Figure 2:
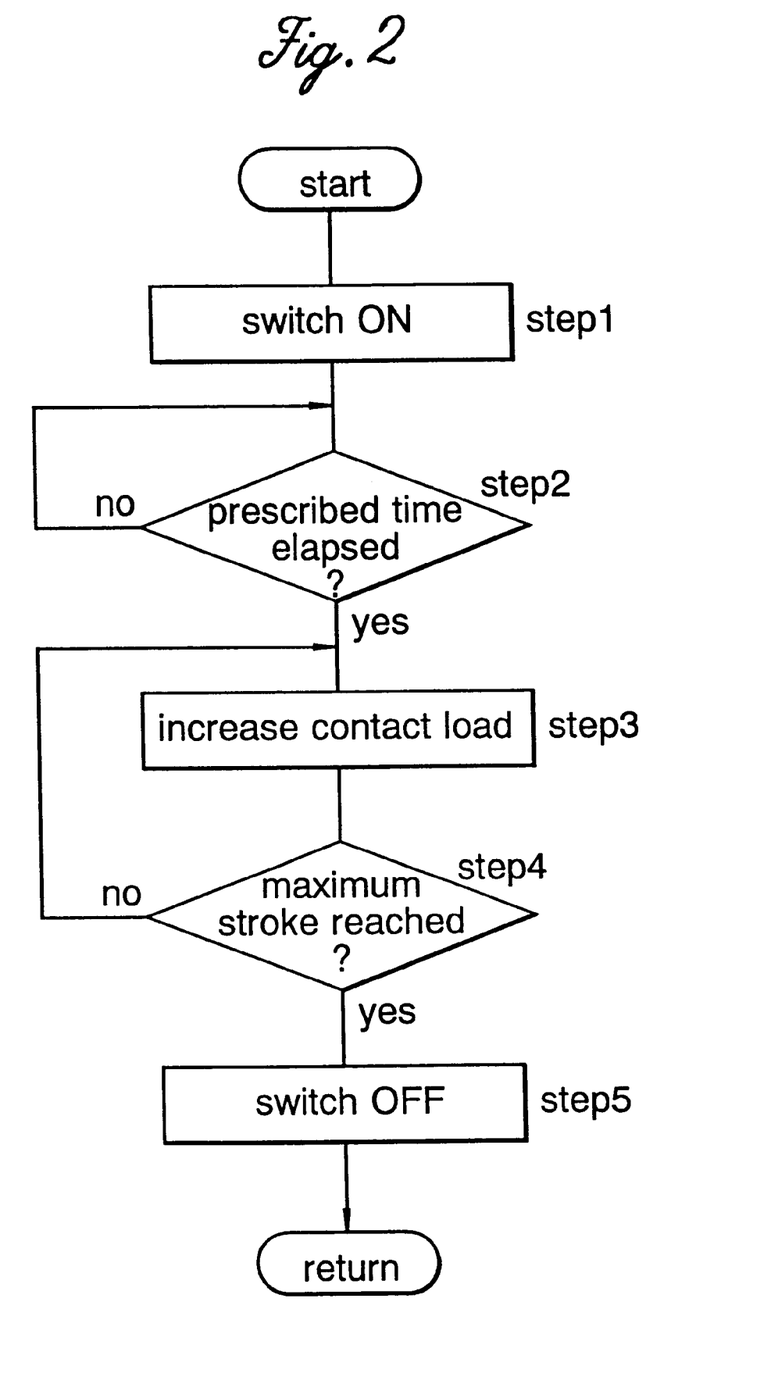
FIG. 2 is a control flow chart of the control unit of the system illustrated in FIG. 1.

As shown in FIG. 2, when a switch 27 is turned on (step 1), a resulting signal is forwarded to a manual control unit 28, and a timer incorporated in the manual control unit 28 is started. When the prescribed time period has elapsed (step 2), a start signal is forwarded to a contact load control unit 29, and a contact load control is initiated (step 3). When the stroke sensor 21 has detected that the piston rod 11 of the actuator 5 has reached a stroke end (step 4), a stop signal is forwarded from the manual control unit 28 to the contact load control unit 29 (step 5).

Figure 3:
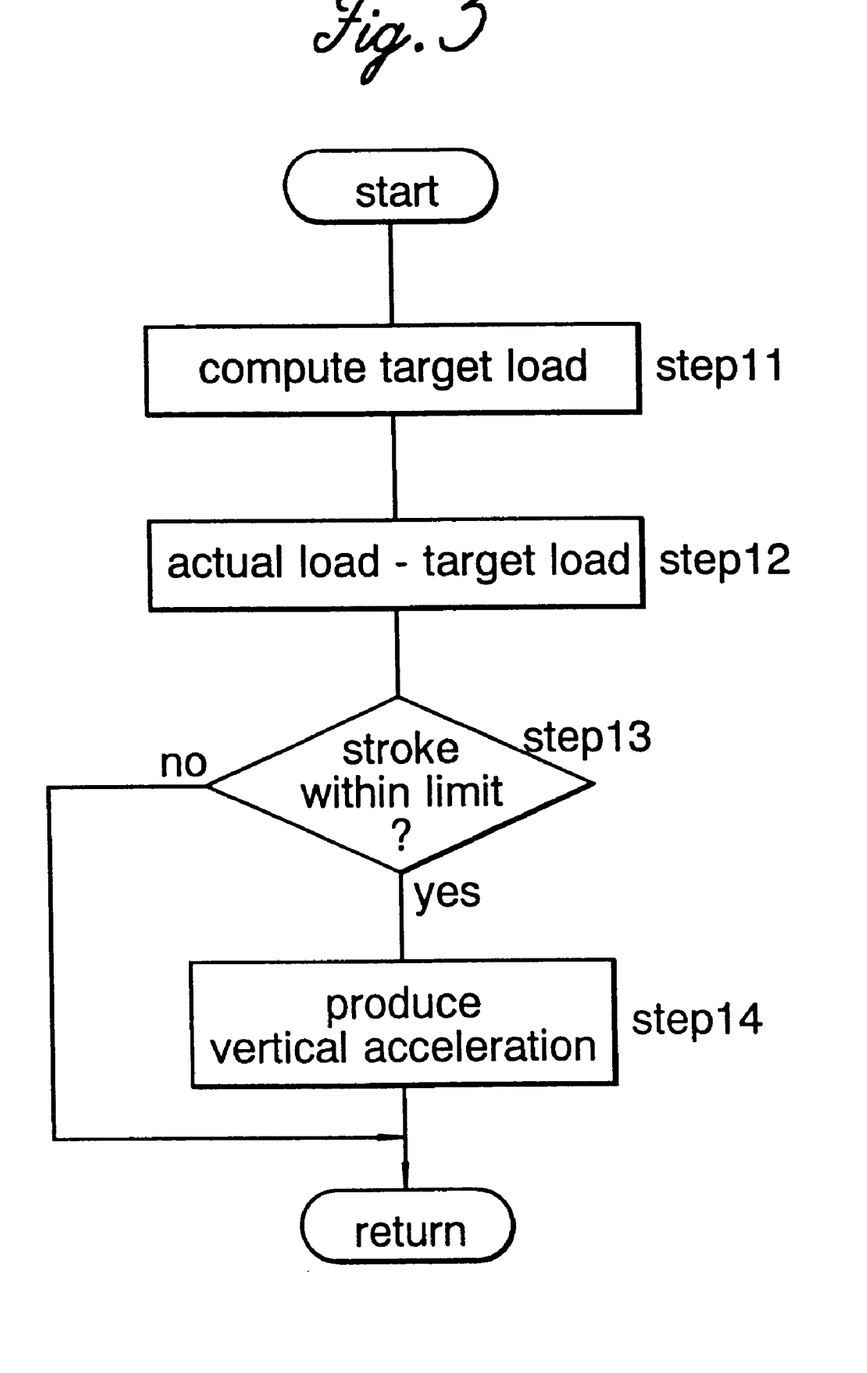
FIG. 3 is a more detailed control flow chart of the step 3 in FIG. 2.

Referring to FIG. 3, in the contact load control action (step 3) of the contact load control unit 29, when the start signal is forwarded from the manual control unit 28 to the contact load control unit 29, a target load computing unit 24 internally defines a target load while referring to the output signals of the sprung mass acceleration sensor 22 and the unsprung mass acceleration sensor 23 (step 11). A stabilizing computing unit 25 then computes a deviation between the actual tire load obtained from the load sensor and the internally defined target tire load (step 12), and processes the deviation to produce a command signal for the servo value driver 19 in cooperation with a stroke limit computing unit 26 which adjusts the command signal so as to keep the stroke of the actuator 5 within a limit (step 13). The adjusted command signal drives the servo valve 10 to produce a prescribed stroke from the actuator 5, and produces a vertical acceleration in at least one of the sprung mass and the unsprung mass so as to increase the tire contact load (step 14). As a result, the tire grip force is temporarily increased, and the slip limit of the tire is raised so as to increase the gripping force available to the tire.

Figure 4:
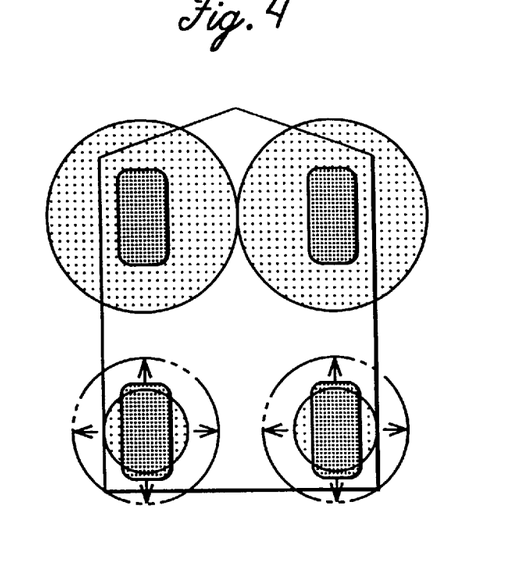
FIG. 4 illustrates a tire contact load distribution when a brake is applied in a vehicle incorporated with the system according to the present invention.

FIG. 4 schematically illustrates the distribution of the tire contact load (=gripping force) among the four wheels of the vehicle during braking. The static contact load is indicated by solid circles, and the dynamic contact load or the contact load produced by the stroke of the actuator 5 is indicated by the double chain dot line. In the example shown in FIG. 4, the contact load of the rear wheels is increased, but the actuator for each individual wheel can be individually controlled so that the actuator for any one of the wheels which is about to lock up may be actuated.

Figure 5:
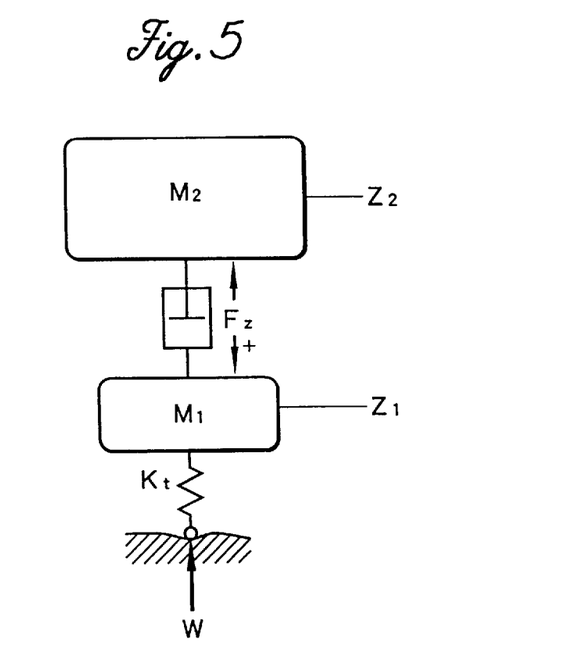
FIG. 5 is a diagram showing a mechanical model of the system shown in FIG. 1 according to the present invention.

The working principle of this invention is described in the following with reference to FIG. 5 in which the following notations are used.

$M_2$: sprung mass $M_1$: unsprung mass $Z_2$: position of the sprung mass $Z_1$: position of the unsprung mass Kt: spring constant of the tire Fz: thrust force of the actuator Suppose that the downward direction corresponds to a positive direction. Then, the equations of motion for the sprung mass $M_2$ and the unsprung mass $M_1$ are given as follows.

$$M_2 \cdot (d^2Z_2/dt^2) = -Fz$$

$$M_1 \cdot (d^2Z_1/dt^2) + Kt \cdot Z_1 = Fz$$

Therefore, the tire contact load W can be given by the following equation.

$$W = -Kt \cdot Z_1 = -Fz + M_1 \cdot (d^2Z_1/dt^2)$$
$$= M_2 \cdot (d^2Z_2/dt^2) + M_1 \cdot (d^2Z_1/dt^2)$$

In other words, the tire contact load W can be given as a sum of the inertia forces of the sprung mass and the unsprung mass. Therefore the tire contact load W can be controlled by controlling the acceleration of extending and retracting the actuator, and thereby changing the inertia force of at least one of the sprung and unsprung masses. In particular, by controlling the individual actuator 5 for each of the wheels, it is possible to increase the contact load W of each tire at a desired timing. For instance, when the suspension stroke is 200 mm, and the actuator 5 can produce a thrust force of one ton or an acceleration of approximately 1 G, the maximum time duration of this inertia force will be approximately 0.2 seconds.

Figure 6:
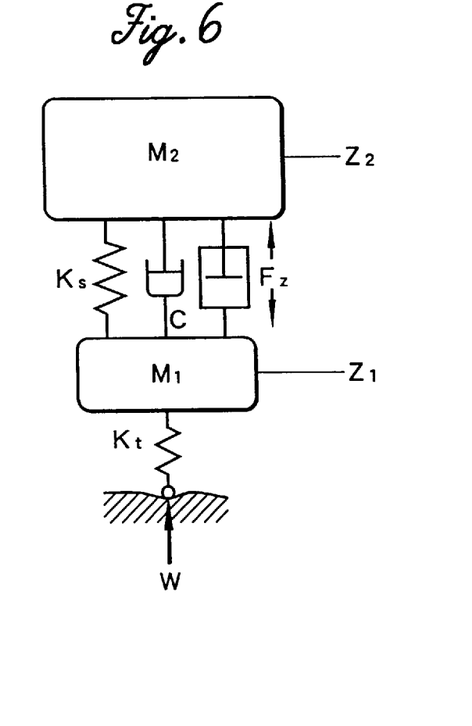
FIG. 6 is a diagram showing a mechanical model of a wheel suspension system incorporated with the system shown in FIG. 1.

Typically, with the aim of minimizing the energy consumption of each actuator, the proposed active wheel suspension system uses a suspension spring for supporting the weight of the vehicle body, and a damper for producing a damping force (see FIG. 6). In this case, if Ks is the spring constant of the suspension spring, and C is the damping coefficient of the damper, the equations of motion for the sprung mass $M_2$ and the unsprung mass $M_1$ are given as follows.

$$M_2 \cdot (d^2Z_2/dt^2) + C \cdot (dZ_2/dt - dZ_1/dt) + Ks \cdot (Z_2 - Z_1) = -Fz$$

$$M_1 \cdot (d^2Z_1/dt^2) + C \cdot (dZ_1/dt - dZ_2/dt) + Ks \cdot (Z_1 - Z_2) + Kt \cdot Z_1 = Fz$$

Therefore, the tire contact load W can be given by the following equation.

$$\begin{aligned} W &= -Kt \cdot Z_1 \\ &= -Fz + M_1 \cdot (d^2Z_1/dt^2) + C \cdot (dZ_1/dt - dZ_2/dt) + Ks \cdot (Z_1 - Z_2) \\ &= M_2 \cdot (d^2Z_2/dt^2) + M_1 \cdot (d^2Z_1/dt^2) \end{aligned}$$

In other words, the tire contact load W can be likewise controlled by controlling the acceleration of extending and retracting the actuator.

The dynamic load produced by the acceleration of extending the actuator 5 only lasts until the piston rod 11 of the actuator 5 reaches an end of the stroke. If necessary, the duration of the contact load control can be extended as described in the following. According to this arrangement, as soon as the piston rod 11 reaches an end of the extending stroke, it is immediately retracted, and a new cycle of extending the piston rod may be started time and again. Therefore, the dynamic load on the wheel which increases the contact load of the tire can be maintained indefinitely or for a desired period of time by thus repeating the cyclic extension and retraction of the actuator (see FIG. 7).

Suppose a case in which the tire contact load is desired to be increased when the vehicle height is approximately at a neutral position. The starting point of a cushioning control (which is described hereinafter) is defined according to a signal from the stroke sensor 21 and the maximum stroke of the actuator 5. The actuator 5 is extended at an acceleration which is sufficient to achieve a desired dynamic load but below the maximum permissible level defined by the capacity of the actuator and the comfort limit of the vehicle occupants. Normally, the sprung mass is far greater than the unsprung mass. Therefore, the force produced from the actuator is applied to the tire contact surface substantially as a reaction to the inertia force of the sprung mass.

When the actuator is allowed to reach its mechanical end of its stroke without taking any measure, an unacceptably large impact force is produced at the sudden end of the stroke. According to the illustrated embodiment, such a result is avoided by the cushioning control which gradually reduces the speed of the piston rod when it is about to reach an end of its stroke. When this is applied to the active wheel suspension system (illustrated in FIG. 6) which uses a suspension spring, the spring reaction can be reduced, and the undesired bouncing movement by the spring can be avoided.

Figure 7:
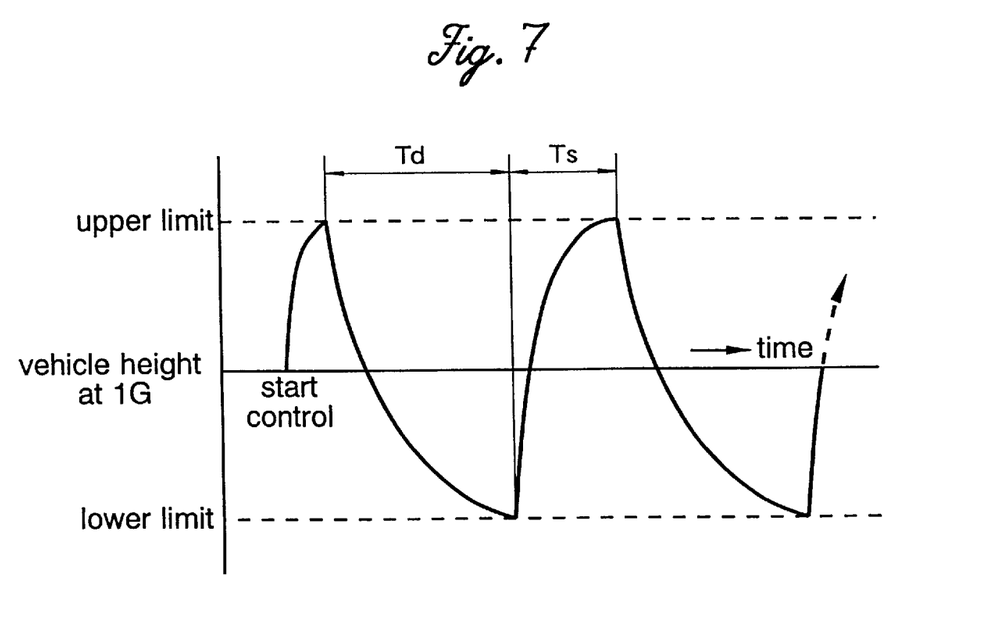
FIG. 7 is a chart showing a cyclical pattern of extension and retraction of the actuator over time according to the invention.

When the limit of an extending stroke is reached, the actuator immediately starts a retracting movement. At this point, because the unsprung mass is far smaller than the sprung mass, if the acceleration of the retracting movement of the actuator is excessive, the contact load may drop by a corresponding degree. To avoid any excessive drop in the contact load, the time duration of the retracting movement in each cycle is made substantially larger than the duration of the extending movement (Td>Ts) as shown in FIG. 7. In the retracting movement also, a cushioning control is conducted before reaching the end of the retracting stroke. By thus repeating the cyclic extending and retracting movement of the actuator, it is possible to increase the effective tire contact load over a desired period of time. The cyclic movement may be carried out either at a fixed frequency or a variable frequency without departing from the spirit of the present invention. Also, the amplitude of the cyclic movement may be varied depending on each particular need.

The switch 27 may consists of a normal manual switch that may be activated by the hand or the foot of the vehicle operator or by any other movement of the vehicle operator.

Hydraulic cylinders were used for the actuators in the above described embodiment, but other actuators may also be used. Such actuators include, not exclusively, electric motors such as linear motors and moving coils, and mechanical arrangements such as cam mechanisms and spring members. Also, the various sensors may be simplified without departing from the spirit of the invention. For instance, the stroke sensor 21 may be omitted because a stroke can be computed by integrating the difference between the outputs from the acceleration sensors for the sprung mass and the unsprung mass 22 and 23. The load sensor 20 may also be omitted, because the output force of the actuator 5 may be computed from the actual values of the sprung mass and the unsprung mass, and the outputs from the acceleration sensors for the sprung mass and the unsprung mass 22 and 23. Also, the accelerations of the sprung mass and the unsprung mass may be indirectly computed from the outputs of the load sensor and the displacement sensor by defining a state estimating unit. The ECU 18 may consist of a digital computer, an analog computer or a hybrid computer.

Thus, according to the present invention, the limit of the grip force of each tire can be raised by the vehicle operator when needed. Therefore, whenever the vehicle occupant considers it appropriate, a greater braking force may be produced so as to reduce the braking distance, and an adequate cornering force may be produced when the vehicle is cornering. It is also possible to increase the traction force of the tire, for instance, when the vehicle is stuck in a slippery spot or when a sudden acceleration is attempted. When the control system is equipped with a timer so as to delay the activation of the contact load control system, it becomes easier for the vehicle operator to time and adjust the operation of the brake pedal, the accelerator pedal and/or the steering wheel in an optimum fashion.

The actuator may be operated by a single stroke so as to increase the contact load for a short time duration. Alternatively, by cyclically operating the actuator, it is possible to extend the time duration of the effective contact load control.

Although the present invention has been described in terms of a preferred embodiment thereof, it is obvious to a person skilled in the art that various alterations and modifications are possible without departing from the scope of the present invention which is set forth in the appended claims.

We claim:

1. A tire contact load control system, comprising:

a wheel suspension system for supporting an unsprung mass including a wheel to a sprung mass including a vehicle body;

an active actuator interposed between said unsprung mass and said sprung mass;

a controller for extending said actuator at a prescribed acceleration so as to selectively apply an additional contact load to said wheel; and a switch unit for activating said controller;

said switch unit being disposed in a passenger compartment of the vehicle body for being actuated by an operator.

2. A vehicle tire contact load control system according to claim 1, further comprising a timer for delaying activation of said controller from a time when said switch unit is operated.

3. A vehicle tire contact load control system according to claim 1, further comprising a stroke sensor for detecting a stroke of said actuator, and stopping operation of said controller when a stroke end of said actuator is detected by said stroke sensor.

4. A vehicle tire contact load control system according to claim 1, wherein said controller is adapted to cyclically operate said actuator so as to increase a contact load in a cyclic manner for a relatively long period of time.

5. A vehicle tire contact load control system according to claim 4, further comprising a timer for stopping operation of said actuator after elapsing of a prescribed time period from a start of operation of said actuator.

* * * * *

UNITED STATES PATENT AND TRADEMARK OFFICE
CERTIFICATE OF CORRECTION

PATENT NO : 6,036,199
DATED : 14 March 2000
INVENTOR(S): Kei Oshida, Masaki Izawa It is certified that error appears in the above-identified patent and that said Letters Patent is hereby corrected as shown below:

Column 1, line 66, after "recognized" insert --that--.

Column 3, line 8, after the semicolon insert --and--.

Signed and Sealed this

Twentieth Day of February, 2001

Attest:

NICHOLAS P. GODICI

Attesting Officer

Acting Director of the United States Patent and Trademark Office